United States Patent
Amagai et al.

(10) Patent No.: US 8,073,006 B2
(45) Date of Patent: Dec. 6, 2011

(54) ATM CELL CONVERSION CIRCUIT AND ATM CELL CONVERSION METHOD

(75) Inventors: Tatsuhiko Amagai, Tokyo (JP); Yuichi Suzuki, Tokyo (JP)

(73) Assignee: Juniper Networks, Inc., Sunnyvale, CA (US)

(*) Notice: Subject to any disclaimer, the term of this patent is extended or adjusted under 35 U.S.C. 154(b) by 1706 days.

(21) Appl. No.: 11/170,789

(22) Filed: Jun. 30, 2005

(65) Prior Publication Data

US 2006/0002396 A1   Jan. 5, 2006

Related U.S. Application Data

(63) Continuation of application No. 09/567,442, filed on May 10, 2000, now Pat. No. 6,944,182.

(30) Foreign Application Priority Data

May 13, 1999   (JP) .................................... 11-133384

(51) Int. Cl.
    *H04J 3/16*   (2006.01)
(52) U.S. Cl. .................. 370/466; 370/412; 370/413
(58) Field of Classification Search .......... 370/412–416, 370/466
    See application file for complete search history.

(56) References Cited

U.S. PATENT DOCUMENTS

| | | | |
|---|---|---|---|
| 5,541,919 A * | 7/1996 | Yong et al. | 370/416 |
| 5,764,637 A | 6/1998 | Nishihara | 370/397 |
| 5,867,731 A * | 2/1999 | Williams et al. | 710/29 |
| 5,940,385 A * | 8/1999 | Mita et al. | 370/349 |
| 6,157,614 A * | 12/2000 | Pasternak et al. | 370/236 |
| 6,226,260 B1 | 5/2001 | McDysan | 370/216 |
| 6,418,144 B1 | 7/2002 | Saeki | 370/395.6 |
| 6,510,158 B1 * | 1/2003 | Robotham et al. | 370/399 |
| 6,529,523 B1 | 3/2003 | Kato | 370/466 |
| 6,557,039 B1 * | 4/2003 | Leong et al. | 709/229 |
| 6,606,302 B2 * | 8/2003 | Delattre et al. | 370/230.1 |
| 6,975,630 B1 * | 12/2005 | Kusumoto | 370/395.41 |
| 7,006,472 B1 * | 2/2006 | Immonen et al. | 370/332 |
| 7,016,301 B1 * | 3/2006 | Moore | 370/235 |
| 7,260,609 B2 * | 8/2007 | Fuehrer et al. | 709/207 |

FOREIGN PATENT DOCUMENTS

| | | |
|---|---|---|
| JP | 3-141747 A | 6/1991 |
| JP | 2563819 B2 | 9/1996 |
| JP | 2647002 B2 | 5/1997 |
| JP | 2760343 | 3/1998 |
| JP | 2760343 B2 | 3/1998 |
| JP | 2000-151633 A | 5/2000 |

\* cited by examiner

*Primary Examiner* — Huy Vu
*Assistant Examiner* — Dady Chery
(74) *Attorney, Agent, or Firm* — Harrity & Harrity, LLP (57) ABSTRACT

Sending priority of plural stages is statically assigned according to a quality class and an output connection, and the sending priority is dynamically changed according to a state of sending request stacking every sending priority and a state of ATM cell conversion processing of a frame, and ATM cell conversion request means for issuing an ATM cell conversion request is provided every output route, and the cell conversion processing of the frame is selected and performed in the order of higher sending priority every time one cell conversion.

23 Claims, 7 Drawing Sheets

ATM CELL CONVERSION CIRCUIT AND ATM CELL CONVERSION METHOD

CROSS REFERENCE TO RELATED APPLICATIONS

This application is a continuation of U.S. patent application Ser. No. 09/567,442 filed May 10, 2000, now U.S. Pat. No. 6,944,182, the disclosure of which is hereby incorporated herein by reference. The present invention claims priority from Japanese Patent Application No. 11-133384 filed May 13, 1999, the contents of which are incorporated herein by reference.

BACKGROUND OF THE INVENTION

1. Field of the Invention

The present invention relates to an ATM (Asynchronous Transfer Mode) network and particularly to a technique for converting data of a frame format into a cell which is a transfer format in the ATM network and outputting the cell.

2. Description of Related Art

In order to perform line accommodation of synchronous transfer mode, exchange control, signaling processing, upper layer processing and so on, an ATM cell conversion circuit for converting data of a frame format into a cell format has been used in an ATM exchange since the past. However, processing of ATM cell conversion by this ATM cell conversion circuit often becomes bottleneck of processing of the exchange, so that speedup and high efficiency of processing have been desired.

As the conventional art associated with the ATM cell conversion circuit, the art applicable to an exchange switch for outputting ATM cells to multiple routes or an apparatus of the input side of a multiplexer for multiplexing cells every route is disclosed in Japanese Patent No. 2760343. This ATM cell conversion circuit constructs frame information designated by a processor into ATM cells used in an ATM network with reference to external memory, and outputs the ATM cells to switch means for performing distribution on a output route basis.

In the conventional ATM cell conversion circuit, however, the buffer amount or the ATM network band which the ATM exchange has is finite and on the contrary, consideration of efficiently using finite resources which the exchange or the network has is not given and as the contents of the consideration, for example, a quality class every respective frame or priority assigned every output connection is considered to perform sending.

SUMMARY OF THE INVENTION

The present invention is implemented in view of the above-mentioned problems, and it is an object of the invention to provide an ATM cell conversion circuit and an ATM cell conversion method in which in addition to a cell conversion method statically assigned every frame or output connection according to a quality class, priority of a frame for making cell conversion is dynamically changed in consideration of congestion states of plural stages every output route, a frame length to be sent or elapsed time of cell conversion processing, etc. and thereby, fine sending priority control can be performed and further ATM cell conversion processing and ATM cell output control with high efficiency can be performed, with the result that efficiency of buffer resources within an apparatus and network use can be more improved.

According to a first aspect of the present invention, there is provided an ATM cell conversion circuit comprising cell conversion means for processing cell conversion to convert data of a frame format (hereinafter simply called "frame") into cells which are a transfer format in the asynchronous transfer mode (ATM) and outputting the converted cells to switch means for distributing sending cells every route for output to send out the cells to an ATM network; and cell conversion request means provided every output route for issuing a cell conversion request of a frame whose sending request has occurred to the cell conversion means, characterized in that the cell conversion means selects the next cell conversion request to process cell conversion of the corresponding frame every time cell conversion of the frame corresponding to one cell conversion request is processed by one cell.

It is desirable that the cell conversion request means sets sending priority to frames whose sending request has occurred on a predetermined condition and the cell conversion means processes cell conversion of the frames in the order of descending sending priorities of cell conversion requests. It is particularly preferable that static priority to a frame whose sending request has occurred is previously assigned according to the quality class and output connection, and sending priority is dynamically changed according to the number of sending requests (a state of stacking) of the frame to which the same static priority is assigned and a state of cell conversion processing.

Specifically, it is preferable to measure time taken from the time when issuing the cell conversion request to the time when starting the cell conversion processing and raise sending priority assigned to the corresponding frame as the time elapses. Also, it is preferable to raise sending priority of a frame during execution of cell conversion processing if a sending request of a frame with higher sending priority for the same output route has occurred during execution of cell conversion processing of a frame with lower sending priority. Sending priority of the frame exceeding the number of limits may be raised if the number of sending requests of the accepted frames exceeds the predetermined number of limits every sending priority. Sending priority of the frame may be raised with a decrease in the residual frame length of a frame to be sent. Cell conversion processing of the frames by rotational priority every time cell conversion and sending of one cell may be performed if cell conversion requests of the frames with the same sending priority have conflicted.

It is desirable that the cell conversion means masks a lower priority cell conversion request among cell conversion requests from the cell conversion request means corresponding to the output route according to a congestion state notified every output route from the switch means. It is convenient that the congestion state is indicated by a state of plural stages and the number of stages of sending priority of a frame is set so as to become equal to the number of stages of this congestion state.

Each of the cell conversion means may include sending request queues of plural stages for accepting a sending request of a frame every sending priority statically assigned according to a quality class and an output connection, a queue readout control part for reading out these sending request queues in the order of higher sending priority, and a frame information storage part for dynamically changing sending priority according to a state of sending request stacking every sending priority and a state of cell conversion processing of a frame every sending priority and issuing a cell conversion request including information on the corresponding frame based on the sending request queues read out, and the cell conversion means may include a frame buffer for storing a frame whose sending request has occurred, and cell division multiplex means for selecting a cell conversion request in the order of higher sending priority every time one cell conversion and gaining access to the frame buffer to perform cell conversion processing based on information on a frame included in the cell conversion request.

As information on a frame, the cell conversion request may include start address information indicating a storage position of entity information of the corresponding frame in the frame buffer, and frame length information indicating a data length of the frame. In this case, it is preferable that the frame information storage part updates the start address information so as to indicate a storage position in the frame buffer of data for next making cell conversion every time cell conversion processing of one cell in the cell division multiplex means, and also updates the frame length information in consideration of the amount of one cell conversion.

The frame information storage part preferably measures time taken from the time when issuing the cell conversion request to the time when starting the cell conversion processing and raises sending priority assigned to the corresponding frame as the time elapses. The corresponding frame information storage part preferably raises sending priority of a frame during execution of cell conversion processing if a sending request of a frame with higher sending priority for the same output route has occurred during execution of cell conversion processing of a frame with lower sending priority. Sending priority of the frame exceeding the number of limits is preferably raised if the number of sending requests of the frames accepted in the sending request queues exceeds the predetermined number of limits every sending priority. Also, sending priority of the frame to be sent is preferably raised with a decrease in the residual frame length of a frame to be sent.

The cell division multiplex means may perform cell conversion processing of the frames by rotational priority every time cell conversion and sending of one cell if cell conversion requests of the frames with the same sending priority have conflicted. The cell division multiplex means preferably masks cell conversion requests issued by the respective frame information storage parts according to the result of comparison between a congestion state of plural stages notified every output route from the switch means and sending priority of the frame determined by the corresponding frame information storage part.

According to a second aspect of the present invention, there is provided an ATM cell conversion method comprising the steps of issuing a cell conversion request to a frame whose sending request has occurred every the output route, and selecting the next cell conversion request to process cell conversion of the corresponding frame every time cell conversion of the frame corresponding to one cell conversion request is processed by one cell.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 1:
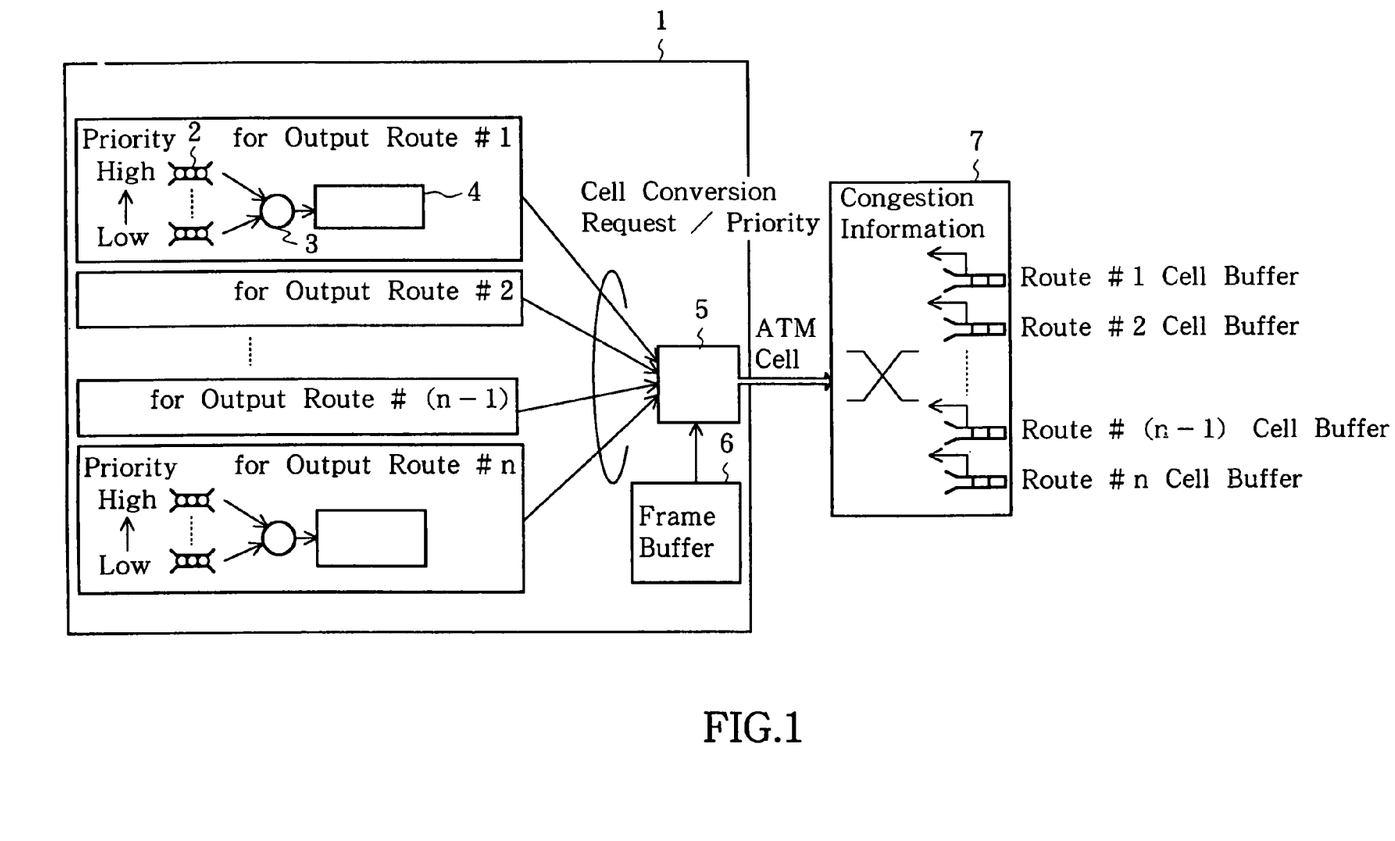
FIG. 1 is a configuration diagram showing one embodiment of an ATM cell conversion circuit of the present invention.

FIG. 1 shows one embodiment of a cell conversion circuit of the present invention. A cell conversion circuit 1 comprises sending request queues 2, a queue readout control part 3, and a frame information storage part 4 independently every output route in order to make cell conversion processing of non-blocking, and comprises a cell division multiplex part 5 in the output side of the frame information storage part 4. A frame buffer 6 is connected to the cell division multiplex part 5. Frames trying to send are stored in the frame buffer 6 and information on the frames is stored in the frame information storage part 4 every the route.

The cell division multiplex part 5 selects a frame for making cell conversion among frames in which storage of information has been completed every route by the frame information storage part 4 according to a congestion state of each route informed from a switch core 7 or sending priority of frames collected by the frame information storage part 4, and makes cell conversion and multiplexing and sends out cells to the switch core 7.

The switch core 7 is a so-called ATM switch of output buffer type having an output buffer every route. The output buffer every route of the switch core 7 has m threshold values, respectively, and can notify the cell conversion circuit 1 of congestion states of m stages in all the output routes by comparing the number of cell stocks with the threshold values in the output buffer.

It is assumed that the cell conversion circuit 1 described here corresponds to an AAL-5 (ATM Adaptation Layer type 5).

The cell conversion circuit 1 has the sending request queues 2 of a frame every route, and there are a plurality of the sending request queues 2 every quality class of a frame and output connection. The quality class of the frame corresponds to a traffic class and includes a CBR (constant bit rate) handled in digitized voice or visual or a VBR (variable bit rate) used in traffic such as packet voice. When a sending request of a frame occurs, priority to the frame is statically provided according to a quality class and information is stacked in the corresponding stage of the sending request queues 2 according to this priority.

The queue readout control part 3 selects a higher priority queue among the sending request queues 2 with stacking and reads out information.

Figure 8:
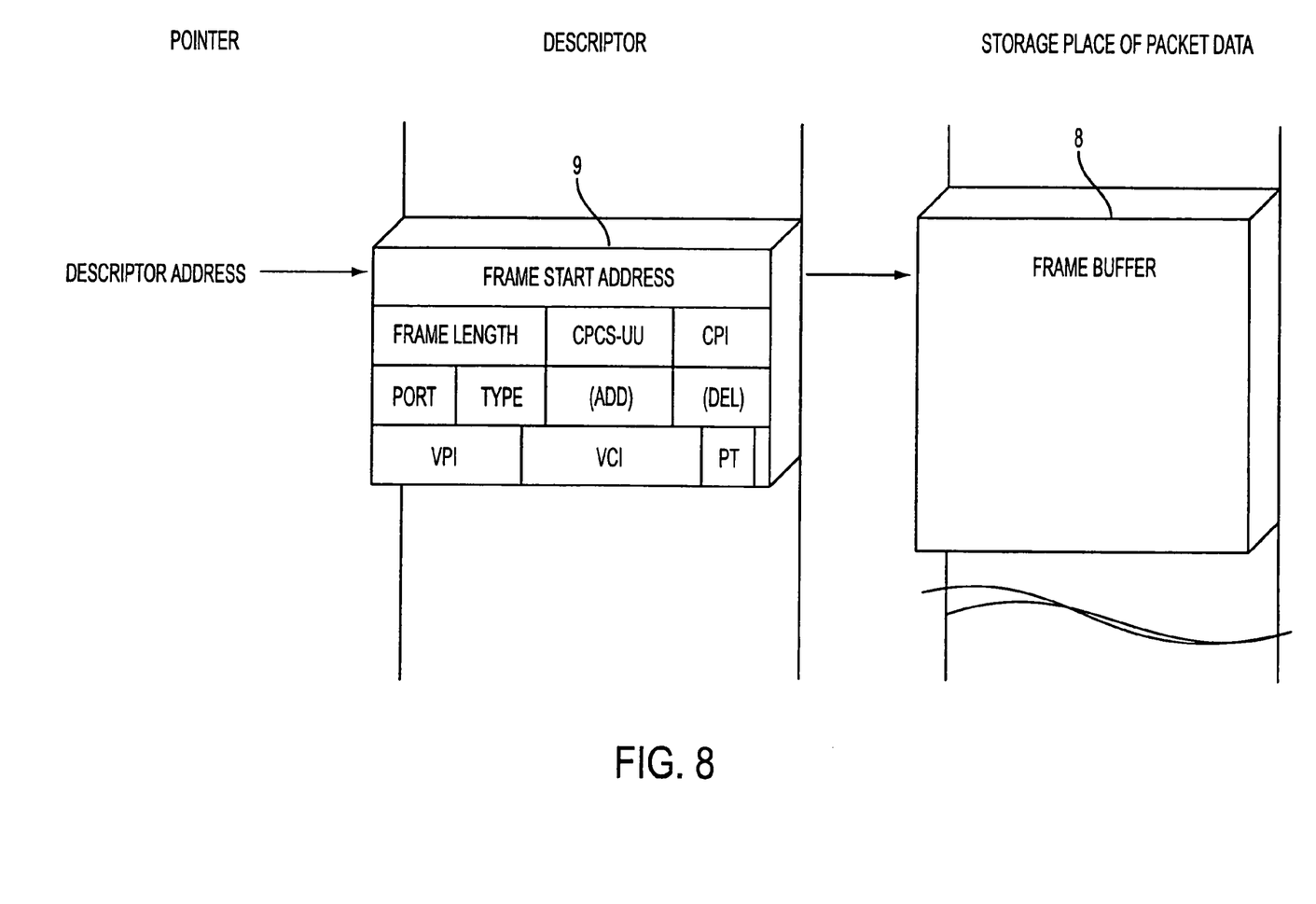
FIG. 8 is an illustration showing a readout relationship of a descriptor address included in the sending request queues, a descriptor collected on the basis of the descriptor address, and a frame from a frame buffer on the basis of the descriptor.

The frame information storage part 4 collects to store information (descriptor) of the frame whose the sending request has occurred and the statically provided sending priority of the frame on the basis of information read from the sending request queues 2. The descriptor includes a frame start address indicating a position for storing an entity of said frame in a frame buffer, a frame length indicating a data length of the frame, output connections (VPI, VCI) for identifying an output route of the frame, etc. as shown in FIG. 8.

The frame information storage part 4 issues a cell conversion request with information of the stored frame to the cell division multiplex part 5 when storage of the descriptor is completed. After the cell division multiplex part 5 receives the cell conversion request from the frame information storage part 4 to send out cells, information of a frame for storage is updated in the frame information storage part 4. The updating is performed so that a storage position of data to make the next cell conversion is indicated by setting the frame start address to "+48 bytes" and the residual frame length is set to "−48 bytes" every time the cell division multiplex part 5 sends out one cell since a payload length of one ATM cell is 48 bytes.

Also, the frame information storage part 4 is provided with a sending timer in the inside thereof, and time taken from the time when the frame information storage part 4 completes storage of frame information to the time when the cell division multiplex part 5 receives the cell conversion request and the frame information from the frame information storage part 4 and makes cell conversion of the corresponding frame to send out it is measured and in case that sending has not been completed even if a predetermined time-out value is reached, the corresponding frame is discarded from the frame buffer 6 by the cell division multiplex part 5.

When cell conversion and sending of one frame has been completed or discard of the frame has been generated in the cell division multiplex part 5, the frame information storage part 4 stops a cell conversion request to the cell division multiplex part 5 and stores information of the next new frame.

Here, as described above, there is priority of a frame as information of which the frame information storage part 4 notifies the cell division multiplex part 5 together with the cell conversion request, and this priority dynamically changes according to an internal state. The initial value of the priority depends on kinds of quality class and output connection determined every frame, and the priority is stepwise increased from the initial value according to the internal state of the cell conversion circuit.

The first condition for raising the priority is a sending timer value indicated by the sending timer provided in the frame information storage part 4. As described below, since the cell division multiplex part 5 accepts a higher priority request in order of priority, there is a fear that a cell conversion request of a lower priority frame does not accepted always and thus frame discard due to the time-out occurs frequently. In the present invention, the priority is stepwise raised with an increase in the sending timer value, with the result that the limit for waiting time of cell conversion can be imposed even for the lower priority frame.

The second condition for raising the priority is a state of a sending request queue. When a sending request of a higher priority frame has occurred for said route in the middle of processing cell conversion of a lower priority frame in the cell division multiplex part 5, a sending for said route is prompted by raising the priority of the frame currently making the cell conversion in order to prevent HOL (Head of Line Blocking). Further, if the number of stacks of a sending request queue exceeds a certain limit, by forcedly raising the priority so as to be held within the limit, a load of the queue can be distributed to queues for other routes under the condition that traffic centralizes on a single route.

Figure 2:
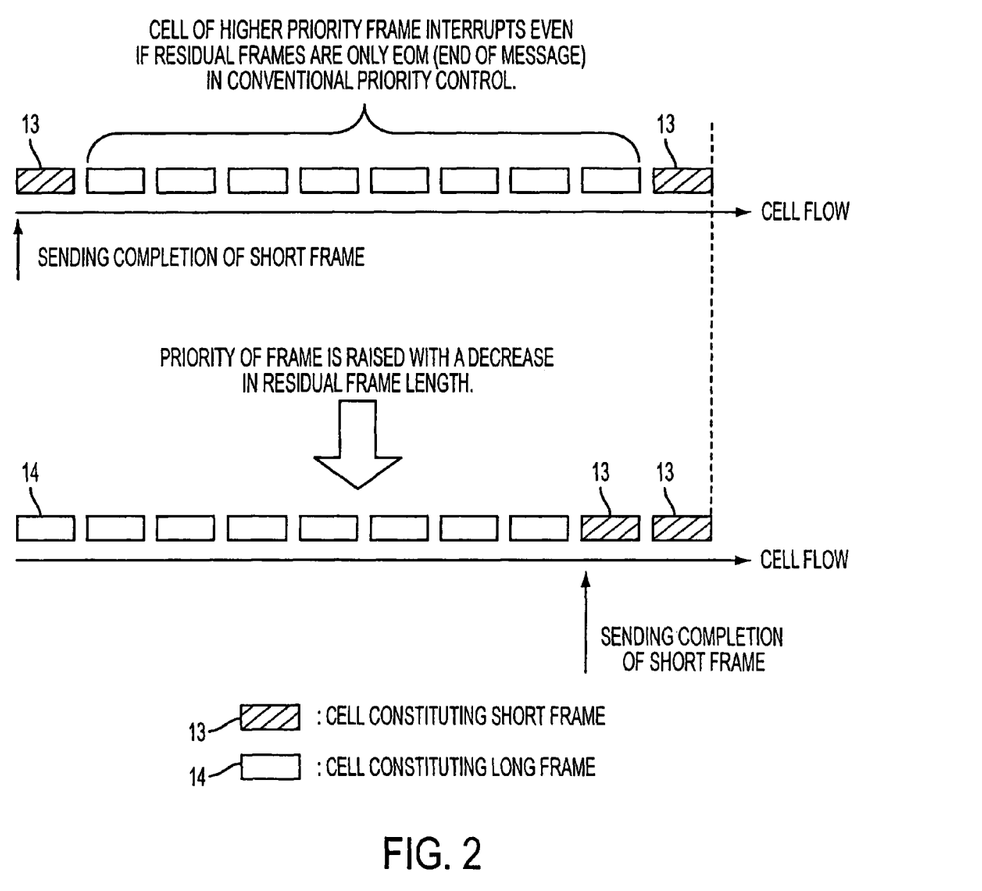
FIG. 2 is an illustration of a situation when cell conversion of long frames and short frames is made to multiplex the frames in the conventional art and the present invention.

The third condition for raising the priority is a residual frame length. The priority is raised higher with a decrease in the residual frame length. In general, a short frame often includes things such as audio information which greatly request real time processing, and also when cell conversion of a plurality of frames is made to multiplex, as shown in FIG. 2, delay time taken to complete a sending of a short frame may increase due to interleaving of a long packet, so that the short frame is preferably processed in order of higher priority.

Also, it takes a measure of time to perform operations from reading of the sending request queues 2 by the queue readout control part 3 to collection and storage of information on a sending frame by the frame information storage part 4. Because of that, the frame information storage part 4 promotes cell conversion processing in the cell division multiplex part 5 by raising the priority to the frame which has become short in residual frame length. Since the frame completes sending in order of higher priority, preparations for sending a new frame starting by trigger of the sending completion, namely acceleration of new storage of frame information in the frame information storage part 4 can be made during cell conversion of the subsequent frame for other routes, so that the whole efficiency of the cell conversion processing of the frame is improved.

The cell division multiplex part 5 receives cell conversion requests from the frame information storage part 4 every route and selects a frame for making cell conversion. For selection, the cell conversion request of a higher priority frame is selected in order of higher priority.

Figure 3:
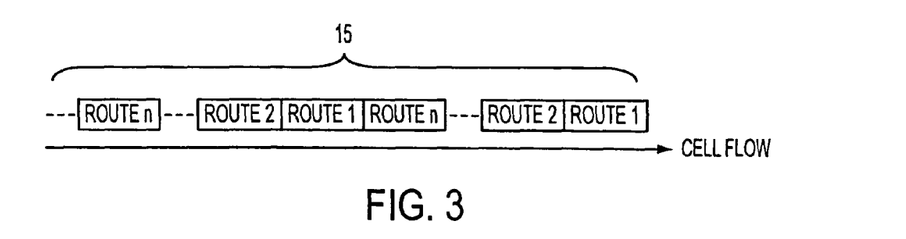
FIG. 3 is an illustration of operations for selecting frames to make cell conversion by rotational priority.

If the cell conversion requests of frames with the same priority have conflicted, the frame for making cell conversion is selected by rotational priority every sending of one cell in order to keep fairness as shown in FIG. 3. Further, the cell division multiplex part 5 can control cell sending according to congestion states by masking a cell conversion request from the frame information storage part 4 according to the congestion states of each route notified by the switch core 7. The mask of the cell conversion request is made by associating the priority of m stages of the requested frame with the congestion state of m stages of the switch core 7. In the case that a route n of the switch core 7 is in the congestion state of m stage, when the priority of a frame for the route n is lower than m, the cell conversion request is masked and cell sending of the frame for the route n is stopped.

In this case, information on the frame itself whose cell conversion request has been masked is not sent out and remains stored in the frame buffer, and when the congestion state of a route to be outputted has become lower than or equal to the own priority, the cell division multiplex part 5 releases mask processing to the above cell conversion request and reads out the corresponding frame from the frame buffer 6 to process the cell conversion and then, performs output to the switch core 7.

When determining a frame for making cell conversion, the cell division multiplex part 5 reads out one cell of data from the frame buffer 6 based on a frame start address notified from the corresponding frame information storage part 4 and attaches ATM cell headers (Frame Length, CPCS-UU, CPI shown in FIG. 8) and sends the data to the switch core 7. When the sent frame is EOM (End of Message), namely the residual frame length to be sent is shorter than 48 bytes, padding and AAL5 trailer are appended as necessary.

Figure 4:
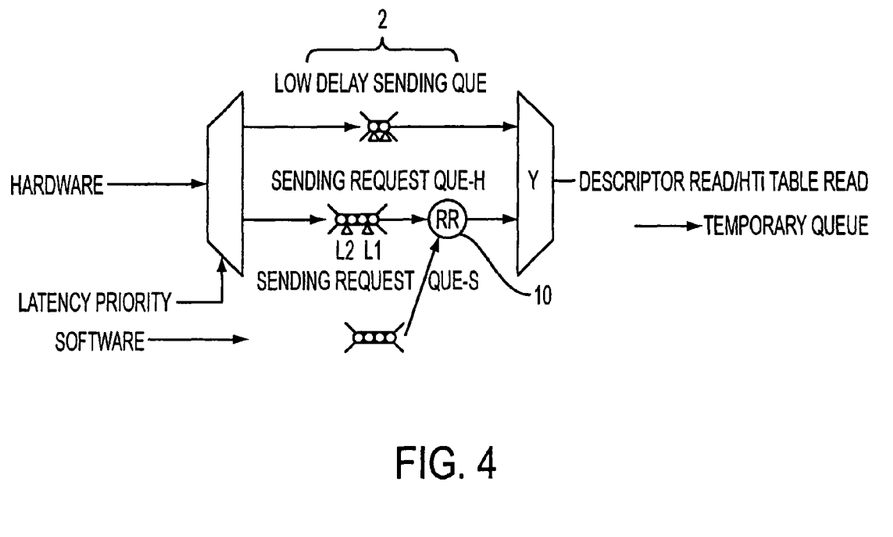
FIG. 4 is an illustration of readout control of a plurality of sending request queues by a queue readout control part.

Next, readout control of a plurality of the sending request queues 2 by the queue readout control part 3 will be described in detail with reference to FIG. 4.

Here, priority statically given every quality class or output connection of a frame will be described as two stages. The queue readout control part 3 reads out a low delay sending queue which is a queue for high delay priority frame among sending request queues for each output route by absolute priority. As shown in FIG. 4, for a sending request from hardware, priority of two stages is given to the frame whose sending is requested according to the quality class or output connection. For a sending request from software, delay priority control in this position is not performed since the low delay sending queue is not provided, and a sending request queue from hardware and a sending request queue from software are selected to read out it by rotational priority through a round robin part RR.

A descriptor address of a frame is stacked in the sending request queues 2 for each output route, and when the queue readout control part 3 reads out the descriptor address, the queue readout control part 3 outputs it to the frame information storage part 4, and the frame information storage part 4 reads a descriptor from external memory based on the inputted descriptor address and stores it in a temporary provided in the inside.

Figure 5:
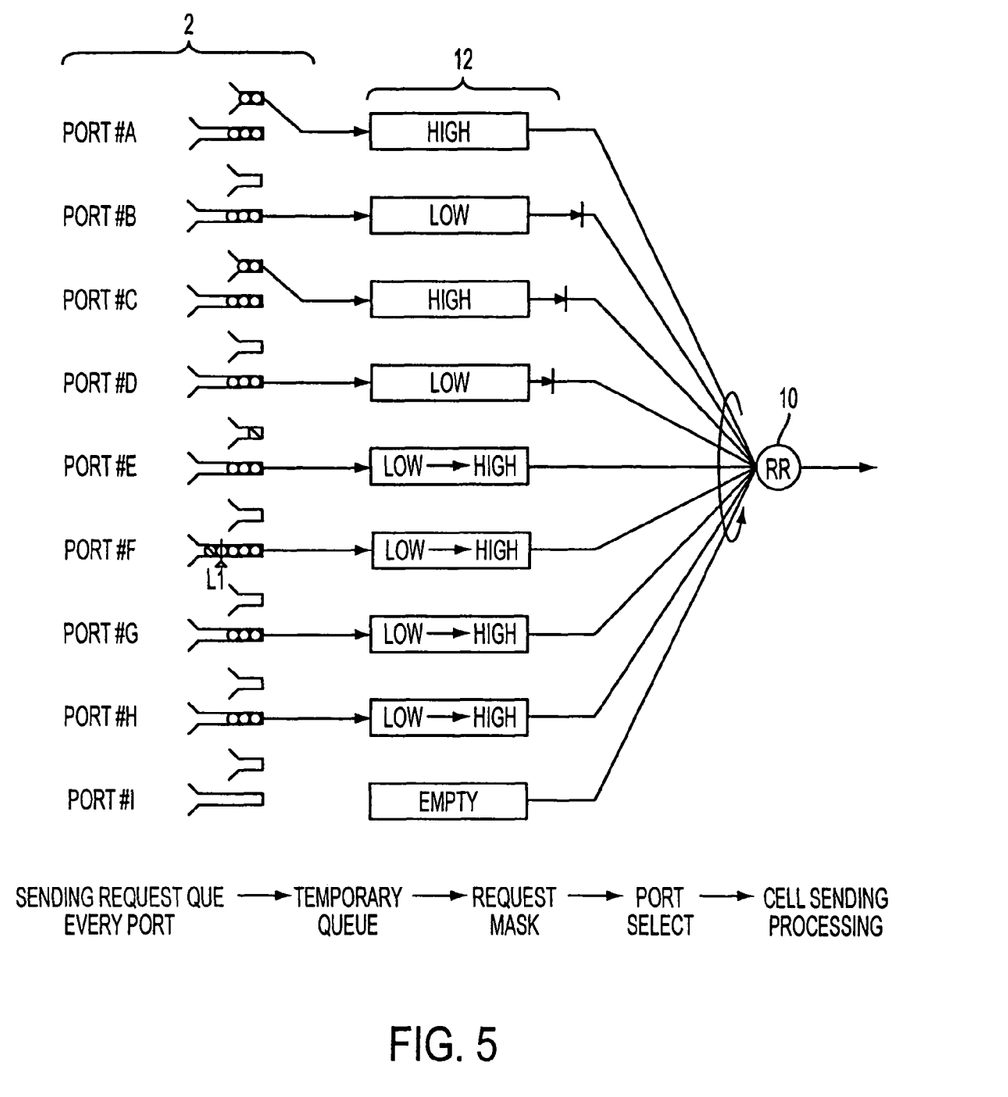
FIG. 5 is an illustration of delay priority control.

FIG. 5 is an illustration showing an image of delay priority control. Here, priority statically given every quality class or output connection of a frame and priority dynamically changed by the above-mentioned first to third conditions will be described as two stages. In the queue readout control part 3, a low delay sending queue is read out by absolute priority (Port #a). When a sending processing request of a higher priority frame has occurred from another route, the cell division multiplex part 5 masks a sending request signal of a lower priority frame and a sending of the frame is stopped (Port #b). When cell conversion processing has conflicted between routes, for the same priority, the routes are selected every time sending of one cell by rotational priority through the round robin part RR provided in the input side of the cell division multiplex part 5, but for different priority, a cell conversion request of a high delay priority frame is selected in order of higher priority.

The switch core 7 notifies the cell division multiplex part 5 of congestion states of plural stages every route. Here, assuming that the cell division multiplex part 5 is notified of the congestion states by back pressure signals (BP) of two stages, when a lower priority frame is notified of a BP level 1, the cell division multiplex part 5 masks a cell conversion request signal of this frame and cell sending of the frame is stopped (Port #d). When a frame is notified of a BP level 2, the cell division multiplex part 5 masks a cell conversion request signal of the frame regardless of whether the frame of the notified route is lower priority or higher priority (Port #c).

Also, even for low delay priority, priority ranks up during cell conversion in the following cases. When a low delay sending queue with higher priority occurs during cell conversion of a lower priority frame (a low delay queue becomes Not Empty), the priority of the frame currently making the cell conversion is ranked up in order to prevent HOL (Port #e). Further, if the number of stacks of a sending request queue exceeds a certain limit, the priority of the corresponding frame is raised so as to be held within the limit, a load of the queue can be distributed to queues for other routes under the condition that traffic centralizes on a single route (Port #f).

Furthermore, by stepwise raising the priority with an increase in a sending timer value and ranking up the frame of the low delay priority to higher priority, a fear that a cell conversion request of a lower priority frame does not accepted always and thus frame discard due to the time-out occurs frequently can be avoided (Port #g).

When information on a frame length of a descriptor stored in a temporary within the frame information storage part 4 is updated every time cell sending and the residual frame length is shorter than 48 bytes, namely the sent cells are only EOM, the frame of the low delay priority is ranked up to higher priority and cell conversion in the cell division multiplex part 5 is promoted. As a result of this, the frame completes sending in order of higher priority, and preparations for sending a new frame starting by trigger of the sending completion, namely acceleration of new storage of frame information in the frame information storage part 4 can be made during cell conversion of the subsequent frame for other routes by the cell division multiplex part 5, so that the whole efficiency of the cell conversion processing of the frame is improved (Port #h).

Figure 6:
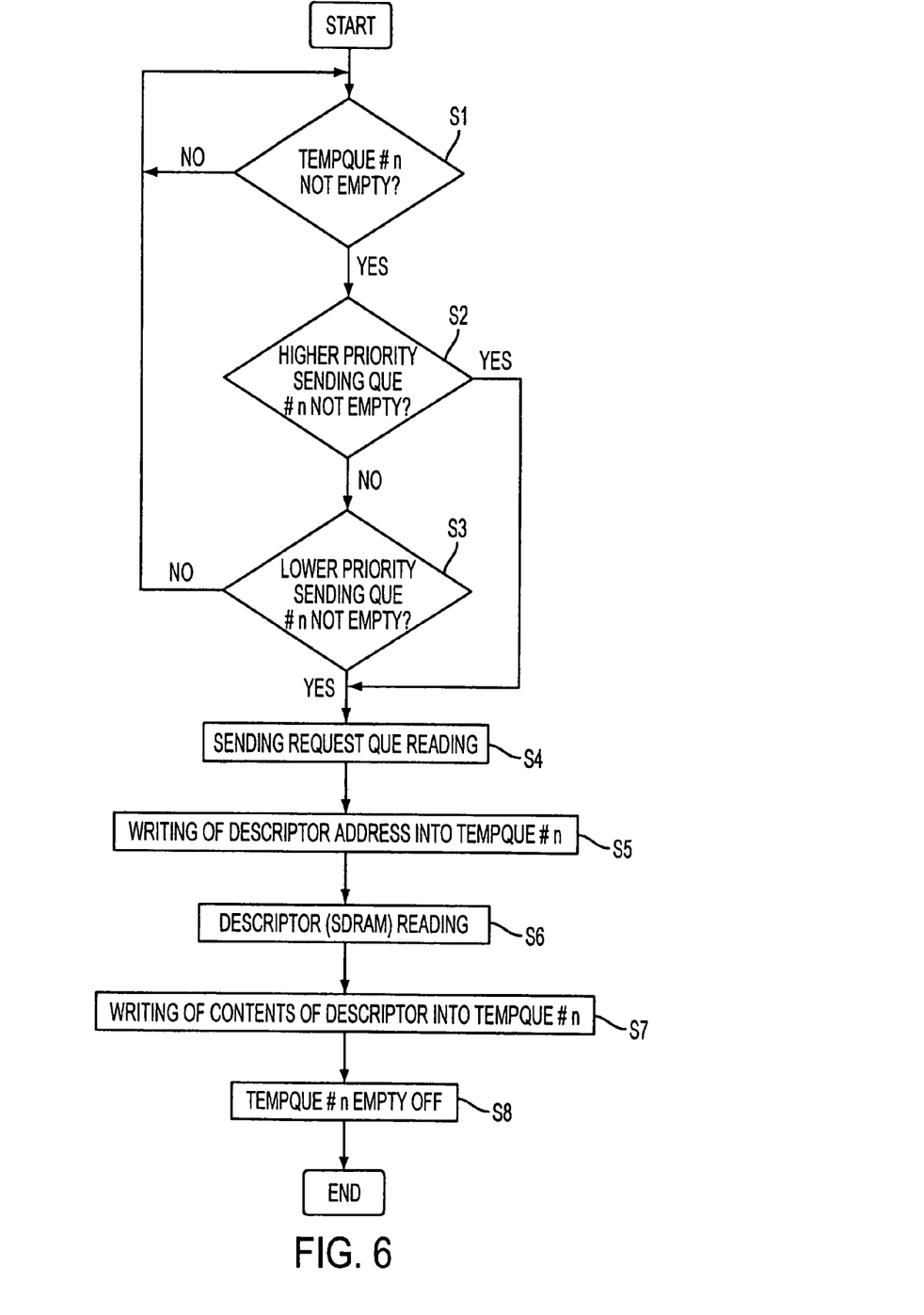
FIG. 6 is a flowchart showing processing operations from readout of the sending request queues of frames by the queue readout control part to writing of a descriptor into a temporary provided in a frame information storage part.

Next, processing operations from readout of the sending request queues 2 of frames by the queue readout control part 3 in each route to writing of a descriptor into a temporary provided inside the frame information storage part 4 will be described in detail with reference to a flowchart of FIG. 6.

First, the queue readout control part 3 determines whether the temporary provided inside the frame information storage part 4 is empty or not, namely the descriptor is stored in the temporary or not (step S1). In this determination, if the queue readout control part 3 determines that the descriptor is not stored in the temporary (step S1/No), the determination of step S1 is again executed. If so (step S1/Yes), it is then determined whether a higher priority sending queue of the sending request queues 2 is empty or not (step S2).

If the queue readout control part 3 determines that the higher priority sending queue is empty in the determination of step S2 (step S2/No), it is then determined whether a lower priority sending queue of the sending request queues is empty or not (step S3). If the queue readout control part 3 determines that the lower priority sending queue is not empty (step S3/Yes), the corresponding sending request queue 2 is read out (step S4).

If the queue readout control part 3 determines that the higher priority sending queue is not empty in the determination of step S2 (step S2/Yes), processing proceeds to step S4 and the corresponding sending request queue 2 is read out. Also, in the determination of step S3, if the queue readout control part 3 determines that the lower priority sending queue is empty (step S3/No), processing proceeds to step S1, and it is again determined whether the temporary provided inside the frame information storage part 4 is empty or not.

When the sending request queue 2 of step S4 is read out, data stacked in the sending request queue 2 is here a descriptor address, so that the frame information storage part 4 writes the descriptor address read out into the temporary (step S5), and the corresponding descriptor is read from external memory (SDRAM in this case) by referring to this address (step S6), and the descriptor is written into the temporary (step S7). At this time, a state of the temporary is released from empty (step S8).

Figure 7:
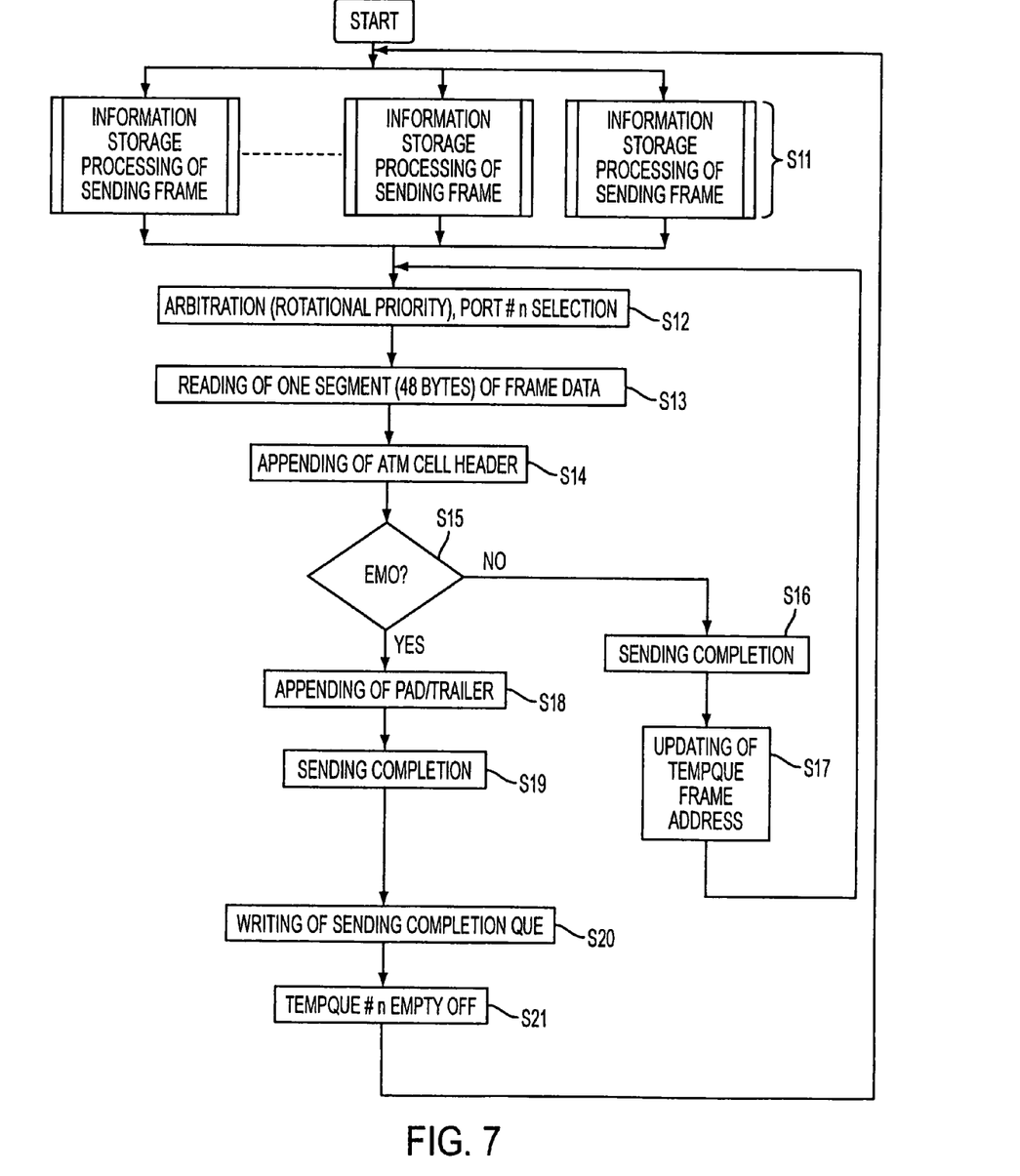
FIG. 7 is a flowchart showing processing operations such as storage processing of frame information by the frame information storage part, selection of a sending frame in a cell division multiplex part, cell construction of frames and cell sending.

Next, processing operations such as storage processing of frame information (descriptor) in the frame information storage part 4 of each route, selection of a sending frame in the cell division multiplex part 5, cell construction of frames and cell sending will be described in detail using a flowchart shown in FIG. 7.

First, in the frame information storage part 4 of each route, while priority is dynamically given to a frame to which priority is statically given according to an internal state within a circuit, information (descriptor) of the frame is collected and stored (step S11). The cell division multiplex part 5 selects a frame for making cell conversion by input of priority given to a sending frame of each route through the round robin part RR provided in the input side. If the cell conversion requests of frames with the same priority have conflicted here, the frame for making cell conversion is selected by rotational priority every time sending of one cell in order to keep fairness (step S12).

When selecting the frame for making cell conversion, the cell division multiplex part 5 reads out one segment (48 bytes) of frame data from a frame buffer based on a frame start address of a descriptor notified from the corresponding frame information storage part 4 (step S13), and CRC operations are performed and ATM cell headers are appended (step S14). In this case, the cell division multiplex part 5 determines whether the frame data appending the ATM cell headers is EOM or not according to information of a frame length included in the descriptor notified from the frame information storage part 4 (step S15).

In the determination of step S15, if the cell division multiplex part 5 determines that the frame data for making cell conversion is not EOM (step S15/No), the cell is sent to the switch core 7 (step S16), and the frame information storage part 4 updates the start address of the frame buffer in the descriptor stored in the temporary to "+48 bytes" and the residual frame length to be sent to "−48 bytes" (step S17).

In the determination of step S15, if the cell division multiplex part 5 determines that the frame data for making cell conversion is EOM (step S15/Yes), as necessary, padding and AAL5 trailer are appended and cell conversion is made (step S18), and the cell is sent to the switch core 7 (step S19). When the frame sending is completed, the cell division multiplex part 5 writes a descriptor address of the frame into a sending completion queue within the frame buffer (step S20) and thereby, the frame information storage part 4 frees the descriptor of the frame stored in the temporary and set the temporary to empty (step S21). Information on the frame itself newly stored in the frame buffer is preserved in the corresponding position by referring to the written sending completion queue.

As is evident from the above description, according to the present invention, since sending request queues or a frame information storage part are provided independently every output route, even if one route becomes a congestion state and cell sending to the corresponding route is stopped, cell conversion and sending for other routes can be made, so that efficiency of buffer use can be improved and a discard rate of frames or cells in the whole apparatus can be reduced.

Since cell conversion is made according to priority of the frame, higher priority data can be processed at a low delay and a low discard rate, and further by dynamically changing the priority of the frame for making cell conversion during cell conversion processing, fine priority control can be performed, with the result that apparatus and network operations with high efficiency can be performed.

By changing the priority with elapsed time of cell conversion processing, the limit for waiting time of the cell conversion processing of a lower priority frame can be imposed.

In the condition that a sending request of a higher priority frame for the same route has occurred during processing of a lower priority frame, the priority of the frame currently making cell conversion is raised to promote processing of the corresponding route, with the result that delay time of sending of the subsequent higher priority frame can be reduced.

Since a route with a heavy load is recognized by a state of queues every route which a cell conversion circuit itself has and priority of a frame can be dynamically changed according to the load state, the load can be distributed to other routes with a light load and efficiency of buffer use can be improved.

In sending of plural frames with the same priority, sending can be alternately performed in a unit of cell which is a smaller data unit, so that fairness can be held in terms of sending delay time. Also, a higher priority frame can interrupt sending processing of a lower priority frame in the unit of cell, time of the sending processing of the higher priority frame can be reduced in a shorter time unit.

During cell conversion processing of a frame, priority can be dynamically changed according to a frame length to make cell conversion, so that efficiency of the cell conversion processing can be improved while a shorter frame is processed in order of higher priority.

A cell conversion circuit of the present invention can grasp congestion states of plural stages every route, and by defining priorities of the same number as the congestion states quantized in the plural stages to sending data, finer priority control can be performed in cell conversion processing and cell sending.

What is claimed is:

1. A system, comprising:
   a memory to store data frames;
   a plurality of queues to:
      store transmit requests associated with the data frames stored in the memory; and
   control logic to:
      set an initial priority for each of the stored transmit requests, and
      change the initial priority for at least one of the stored transmit requests based on an internal state of the system, where, when changing the initial priority, the control logic is to:
         increase the priority of a transmit request associated with a first data frame based on a residual length of the first data frame.

2. The system of claim 1, where, when setting an initial priority for a first transmit request associated with a first data frame, the control logic is to set the initial priority for the first transmit request based on a quality class associated with the data frame.

3. The system of claim 1, further comprising:
   processing logic to:
      process the data frames associated with the transmit requests in an order based on the priorities of the transmit requests.

4. the system of claim 3, where, when changing the initial priority, the control logic is to:
   increase the priority for a first transmit request as time elapses from when the processing logic receives a request to process a first data frame associated with the first transmit request until the processing logic begins processing the first data frame.

5. The system of claim 3, where, when processing the data frames, the processing logic is to:
   divide each of the data frames into portions having a predetermined size.

6. The system of claim 3, where, when changing the initial priority, the control logic is to:
   modify the priority for a first transmit request based on a number of transmit requests having a same priority as the first transmit request and a state of the processing logic.

7. The system of claim 1, where the control logic is further to:
   increase the priority for a first transmit request associated with a first data frame when a second transmit request associated with a second data frame having a higher priority for a same output route has occurred during processing of the first data frame.

8. The system of claim 1, where, when increasing the priority of a transmit request associated with a first data frame based on a length of the first data frame, the control logic is further to:
increase the priority of the transmit request associated with the first data frame relative to a priority of a transmit request associated with a second data frame, where the first data frame has a shorter length than the second data frame.

9. The system of claim 1, where, when changing the initial priority, the control logic is further to:
determine if a number of stored transmit requests having a first priority exceeds a predetermined number, and
increase the priority of the transmit requests having the first priority when the number exceeds the predetermined number.

10. A method performed by a device, comprising:
storing, by a processor of the device, data frames in a memory of the device;
setting, by the processor, a priority for each of a plurality of transmit requests associated with the data frames stored in the memory; and
changing, by the processor, the priority for at least one of the transmit requests, where changing the priority includes:
increasing the priority for at least one of the transmit requests based on a residual data frame length.

11. The method of claim 10, where the setting a priority for each of the plurality of transmit requests comprises:
setting an initial priority for a transmit request associated with a first data frame based on a quality class associated with the first data frame.

12. The method of claim 10, further comprising:
processing the data frames associated with the transmit requests in an order based on the priorities of the transmit requests.

13. The method of claim 10, where the changing the priority comprises:
dynamically increasing the priority for a first transmit request as time elapses from when a request to process a first data frame associated with the first transmit request is received until processing of the first data frame begins.

14. The method of claim 10, further comprising:
dividing each of the data frames into portions having a predetermined size prior to forwarding.

15. The method of claim 10, where changing the priority comprises:
modifying the priority for a first transmit request based on the congestion status associated with transmit requests having a same priority as the first transmit request.

16. The method of claim 10, where changing the priority comprises:
increasing the priority for a first transmit request associated with a first data frame when a second transmit request associated with a second data frame having a higher priority for a same output route has been received during processing of the first data frame.

17. The method of claim 10, where the increasing the priority for at least one of the transmit requests based on data frame length comprises:
increasing the priority of a transmit request associated with a shorter data frame relative to the priority of transmit requests associated with longer data frames.

18. The method of claim 10, where the changing the priority comprises:
determining if a number of transmit requests having a first priority exceeds a predetermined number, and
increasing the priority of the transmit requests having the first priority when the number exceeds the predetermined number.

19. The method of claim 10, further comprising:
generating a data processing request associated with a first data frame, the data processing request comprising an address associated with a location where the first data frame is stored and a value representing a length of the first data frame.

20. A network device, comprising:
a memory to store data frames; and
a processor to:
set an initial priority for each of a plurality of transmit requests associated with the stored data frames, and
change the initial priority for at least one of the transmit requests based on a residual data frame length.

21. A network device, comprising:
a plurality of queues to:
store transmit requests associated with data frames received by the network device; and
logic to:
set a priority for each of the stored transmit requests, and
change the priority for at least one of the stored transmit requests based on a residual data frame length.

22. The network device of claim 21, where the logic is to change the priority based on data frame length.

23. The network device of claim 21, where the logic is to dynamically change the priority based on data frame processing time.

* * * * *